US009766107B2

(12) United States Patent
Fouad-Fahmi

(10) Patent No.: US 9,766,107 B2
(45) Date of Patent: Sep. 19, 2017

(54) SYSTEM FOR AND METHOD OF MEASURING FLOW OF BULK SOLID MATERIAL

(75) Inventor: Tharwat Fouad-Fahmi, Mississauga (CA)

(73) Assignee: ANUBIS MANUFACTURING CONSULTANTS CORP., Mississauga (CA)

( * ) Notice: Subject to any disclaimer, the term of this patent is extended or adjusted under 35 U.S.C. 154(b) by 814 days.

(21) Appl. No.: 13/994,420

(22) PCT Filed: Dec. 15, 2011

(86) PCT No.: PCT/CA2011/050775
§ 371 (c)(1),
(2), (4) Date: Jun. 14, 2013

(87) PCT Pub. No.: WO2012/079174
PCT Pub. Date: Jun. 21, 2012

(65) Prior Publication Data
US 2013/0275061 A1 Oct. 17, 2013

Related U.S. Application Data

(60) Provisional application No. 61/423,406, filed on Dec. 15, 2010.

(51) Int. Cl.
*G01F 1/76* (2006.01)
*G01F 1/704* (2006.01)
(Continued)

(52) U.S. Cl.
CPC .............. *G01F 1/76* (2013.01); *G01F 1/704* (2013.01); *G01F 1/86* (2013.01); *G01F 13/003* (2013.01); *G01F 13/005* (2013.01)

(58) Field of Classification Search
CPC .......... G01F 1/76; G01F 1/704; G01F 13/003; G01F 1/86; G01F 13/005
See application file for complete search history.

(56) References Cited

U.S. PATENT DOCUMENTS 3,549,263 A   12/1970  Osawa et al.
4,154,533 A    5/1979  Levine
(Continued)

FOREIGN PATENT DOCUMENTS

AU       2004210562 A1 *  4/2005
CN         201569481 U     9/2010
(Continued)

OTHER PUBLICATIONS

Office Action issued Feb. 15, 2015 in respect of Chinese Patent Application No. 201180067551.4.
(Continued)

*Primary Examiner* — Alexander Satanovsky
*Assistant Examiner* — Lina Cordero
(74) *Attorney, Agent, or Firm* — Bereskin & Parr LLP/S.E.N.C.R.L., s.r.l.

(57) ABSTRACT

A conveyor mechanism conveys a powder along a path. A first camera device arranged above the conveyor mechanism detects movement of a recognizable feature on an upper surface of the powder over a period of time. A velocity of the powder can be determined based on the movement of the recognizable feature over the period of time. A device can be used to generate the recognizable feature. A first light-emitting device can illuminate the upper surface to aid detection of the recognizable feature. A second light-emitting device can project a contour line on the upper surface, and a second camera device can be used to detect a position of the contour line. A cross sectional area of the powder can be correlated based on the position of the contour line.

20 Claims, 9 Drawing Sheets

(51) Int. Cl.
*G01F 1/86* (2006.01)
*G01F 13/00* (2006.01)

(56) References Cited

U.S. PATENT DOCUMENTS

| | | | |
|---|---|---|---|
| 4,349,112 A | 9/1982 | Wilks et al. | |
| 4,422,760 A | 12/1983 | Webster | |
| 4,538,908 A | 9/1985 | Webster | |
| 4,749,273 A * | 6/1988 | Reinhold | G01F 1/002 356/5.05 |
| 5,294,756 A * | 3/1994 | Lauber | G01G 11/04 177/119 |
| 5,480,354 A * | 1/1996 | Sadjadi | A01D 41/1271 460/149 |
| 5,532,942 A | 7/1996 | Kitamura et al. | |
| 5,652,432 A | 7/1997 | Yaginuma | |
| 6,158,293 A | 12/2000 | Poole | |
| 6,604,991 B1 * | 8/2003 | Jurs | B26D 5/00 452/150 |
| 6,753,966 B2 | 6/2004 | Von Rosenberg | |
| 6,816,793 B2 | 11/2004 | Chow et al. | |
| 6,985,798 B2 | 1/2006 | Crowder et al. | |
| 7,204,164 B2 | 4/2007 | Kalidindi | |
| 7,623,233 B2 | 11/2009 | Freese et al. | |
| 7,677,411 B2 | 3/2010 | Crowder et al. | |
| 7,701,568 B2 | 4/2010 | Ackley, Jr. et al. | |
| 7,830,530 B2 * | 11/2010 | Jonasson Bjarang | B07C 5/3425 250/225 |
| 2002/0014116 A1 * | 2/2002 | Campbell | A01D 33/00 73/149 |
| 2002/0167537 A1 * | 11/2002 | Trajkovic | G06K 9/32 345/649 |
| 2007/0034417 A1 * | 2/2007 | Moulsdale | B65G 27/32 177/119 |
| 2007/0157990 A1 | 7/2007 | Amano | |
| 2009/0219538 A1 * | 9/2009 | Myrick | G01N 21/4738 356/445 |
| 2010/0149537 A1 | 6/2010 | Myrick et al. | |
| 2010/0189518 A1 * | 7/2010 | Roumieu | B65G 53/20 406/89 |

FOREIGN PATENT DOCUMENTS

| | | | |
|---|---|---|---|
| DE | 4240094 A1 * | 6/1994 | B65G 43/08 |
| DE | 19631926 A1 | 2/1998 | |
| EP | 1653202 A1 | 5/2006 | |
| WO | 2004/002827 A1 | 1/2004 | |
| WO | 2009/019324 A1 | 2/2009 | |
| WO | 2009/124919 A1 | 10/2009 | |
| WO | 2009/126273 A1 | 10/2009 | |
| WO | 2009/146535 A1 | 12/2009 | |
| WO | 2012/079174 A1 | 6/2012 | |

OTHER PUBLICATIONS

Berry et al., Arching Behaviour of Cohesive Powders in a Pilot-Scale Plane-Flow Silo, Task Quarterly, 2003, 479-498, 7-4.

Borzsonyi et al., Rapid granular flows on a rough incline: Phase diagram, gas transition, and effects of air drag, Physical Review E, 2006, 061301-1-061301-9, 74.

Walzel et al., Simulation of Particle Movement on Vibrating Conveyors, Chem. Eng. Technol., 1999, 994-997, 22-12.

International Preliminary Report on Patentability issued Jun. 18, 2013 in respect of International Application No. PCT/CA2011/050775.

Brochure, Bulkscan, SICK AG.

Brochure, LTPR Series, Opto Engineering.

Brochure, Flow Metering, Brabender Technologie.

* cited by examiner

SYSTEM FOR AND METHOD OF MEASURING FLOW OF BULK SOLID MATERIAL

CROSS REFERENCE TO RELATED APPLICATIONS

This is a national stage application of International Application No. PCT/CA2011/050775 filed on Dec. 15, 2011, which claims priority to U.S. Provisional Application No. 61/423,406 filed on Dec. 15, 2010, and the entire contents of each are hereby incorporated herein by reference.

FIELD

The present disclosure relates to bulk material handling systems, and more particularly systems for determining velocity, volume and/or mass flow measurements of a powder being conveyed.

BACKGROUND

The following paragraphs are not an admission that anything discussed in them is prior art or part of the knowledge of persons skilled in the art.

Loss-in-weight feeders, gain-in-weight feeders, and weigh belt feeders can be used to measure the flow of bulk solid materials. Loss-in-weight feeder systems can include a hopper and a feed mechanism that can be continuously weighed, for example, using load cells. As the feed mechanism discharges material from the hopper, mass of the system decreases. A controller can adjust speed of the feed mechanism to maintain a rate of weight loss that matches a desired feed rate. Gain-in-weight feeder systems are similar, and can include a hopper and a feed mechanism that can be continuously weighed. As the feed mechanism discharges material into the hopper, mass of the system increases, and speed of the feed mechanism can be adjusted to maintain a rate of weight gain that matches a desired feed rate. Weigh belt feeder systems can operate by continuously weighing a moving bed of bulk material, and controlling belt speed to maintain a desired feed rate.

Further, vibratory conveyors and belt conveyors are conveyor mechanisms that can be used to convey bulk solid materials. A vibratory conveyor can include a carrying deck or tray and a drive mechanism. The drive system imparts to the deck a vibrating action, and the bulk material on the deck is moved along the deck by means of the vibrating action. A belt conveyor can include two or more pulleys, and a conveyor belt rotating between the two or more pulleys. One or more of the pulleys are driven to move the conveyor belt forward.

SUMMARY

The following summary is intended to introduce the reader to the detailed description that follows and not to define or limit the claimed subject matter.

In an aspect of the present disclosure, a system for measuring flow of a powder can include: a conveyor mechanism to convey the powder along a generally linear path; a first camera device arranged generally above the conveyor mechanism, and configured to detect movement of a recognizable feature on an upper surface of the powder over a period of time; and a processor coupled to the first camera device, and configured to determine a velocity of the powder based on the movement of the recognizable feature over the period of time.

A device coupled to the conveyor mechanism can be configured to generate the recognizable feature. The device can include a piston element arranged generally above the conveyor mechanism, and configured to engage the upper surface of the powder to generate the recognizable feature. The device can include a rudder element arranged generally above the conveyor mechanism, and configured to be at least partially immersed in the powder and transversely pivot relative to the conveyor mechanism to generate the recognizable feature. The device can include a hub arranged generally above the conveyor mechanism, and a blade element coupled to the hub and rotatable thereabout to engage the upper surface of the powder to generate the recognizable feature. The conveyor mechanism can include upper and lower trays, and the device can include a trap door arranged between the upper and lower trays, and configured to permit the powder to fall from the upper tray to the lower tray to generate the recognizable feature.

A first light-emitting device can be arranged generally above the conveyor mechanism, and directed downwardly to illuminate at least a portion of the upper surface to aid detection of the recognizable feature. At least one of the first camera device and the first light-emitting device can be arranged at an angle relative to the upper surface of the powder.

The processor can be further configured to calculate a volume flow rate of the powder based on the velocity and a cross sectional area of the powder. A second light-emitting device can be arranged generally above the conveyor mechanism, and directed downwardly on to the upper surface of the powder to project a contour line on the upper surface; and a second camera device can be arranged generally above the conveyor mechanism, and configured to detect a position of the contour line. At least one of the second camera device and the second light-emitting device can be arranged at an angle relative to the upper surface of the powder. The processor can be further configured to correlate the cross sectional area of the powder based on the position of the contour line.

The processor can be further configured to calculate a mass flow rate of the powder based on the velocity and a weight of the powder over a given length of the conveyor mechanism. At least one load cell can be configured to measure the weight of the powder over the given length of the conveyor mechanism. The conveyor mechanism can include a vibratory conveyor, or a belt conveyor.

In an aspect of the present disclosure, a method of measuring flow of a powder can include: conveying the powder along a generally linear path; detecting movement of a recognizable feature on an upper surface of the powder over a period of time; and determining a velocity of the powder based on the movement of the recognizable feature over the period of time.

The method can further include generating the recognizable feature. The method can further include sequentially generating a plurality of the recognizable features on the upper surface of the powder, and detecting movement of each of the recognizable features over a corresponding one of a plurality of periods of time.

The method can further include illuminating at least a portion of the upper surface of the powder to aid detection of the recognizable feature. The step of illuminating can include directing a first light-emitting device downwardly to illuminate at least the portion of the upper surface.

The method can further include calculating a volume flow rate of the powder based on the velocity and a cross sectional area of the powder. The cross sectional area of the powder can be determined by: directing a second light-emitting device at the upper surface of the powder to project a contour line on the upper surface; identifying a position of the contour line from generally above the powder; and correlating the cross sectional area based on the position of the contour line.

The method can further include calculating a mass flow rate of the powder based on the velocity and a weight of the powder as it is being conveyed.

In an aspect of the present disclosure, a system for measuring flow of a powder can include: a conveyor mechanism to convey the powder along a path; a light-emitting device arranged generally above the conveyor mechanism, and directed downwardly to project a contour line on the powder; a camera device arranged generally above the conveyor mechanism, and configured to detect a position of the contour line; and a processor coupled to the camera device, and configured to correlate a cross sectional area of the powder based on the position of the contour line.

In an aspect of the present disclosure, a method of measuring flow of a powder can include: conveying the powder along a path; directing a light-emitting device at an upper surface of the powder to project a contour line on the powder; identifying a position of the contour line from generally above the powder; and correlating a cross sectional area of the powder based on the position of the contour line.

Other aspects and features of the present disclosure will become apparent, to those ordinarily skilled in the art, upon review of the following description of specific examples.

BRIEF DESCRIPTION OF THE DRAWINGS

The drawings included herewith are for illustrating various examples of apparatuses and methods of the present disclosure and are not intended to limit the scope of what is taught in any way. In the drawings.

DETAILED DESCRIPTION

Figure 1A:
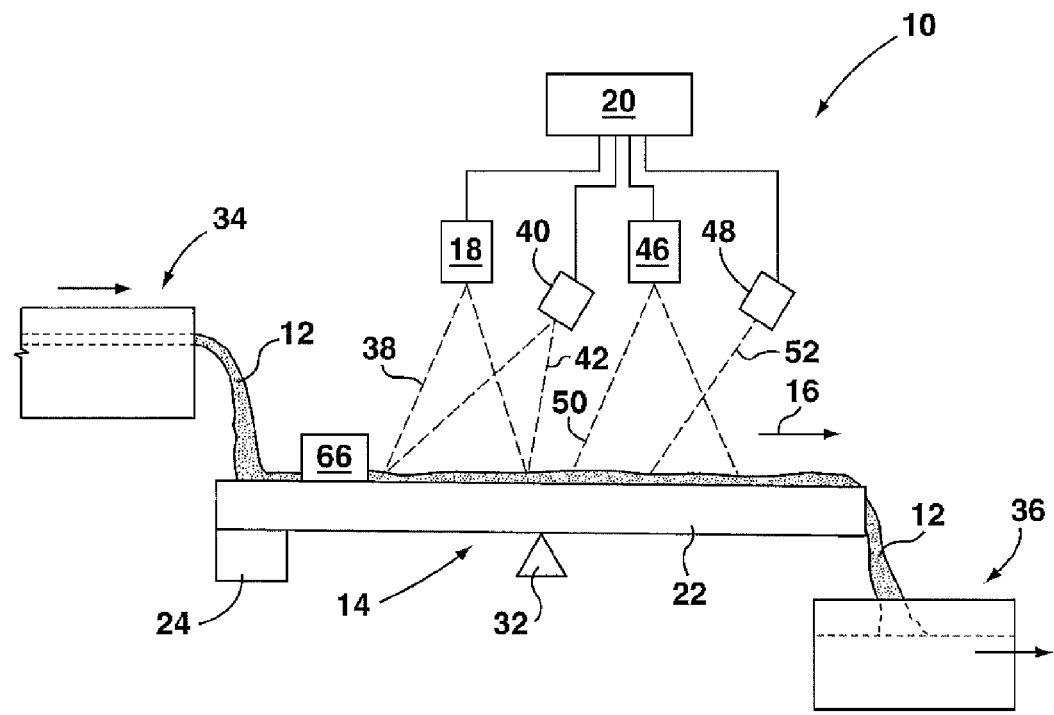
FIG. 1A is a schematic view of a system for measuring flow of a powder.

In the following description, specific details are set out to provide examples of the claimed subject matter. However, the examples described below are not intended to define or limit the claimed subject matter. It will be apparent to those skilled in the art that variations of the specific examples may be possible within the scope of the claimed subject matter. In other instances, known apparatuses and methods have not been described in detail so as not to obscure the examples described herein.

For simplicity and clarity of illustration, where considered appropriate, reference numerals may be repeated among the drawings to indicate corresponding or analogous elements or steps.

Described herein are systems for and methods of using at least one camera device in combination with a conveyor mechanism to measure the velocity, volume flow rate and/or mass flow rate of a powder as the powder is conveyed along the conveyor mechanism.

Referring to FIG. 1A, shown generally at 10 is an example of a system for measuring flow of a powder 12. The system 10 includes a conveyor mechanism 14 to convey the powder 12 along a generally linear path in a direction 16. A first camera device 18 is arranged generally above the conveyor mechanism 14. The first camera device 18 is configured to detect movement of an upper surface of the powder 12 over a period of time. A processor 20 is coupled to the first camera device 18. The processor 20 is configured to determine a velocity of the powder 12 based on the movement of the upper surface of the powder 12 over the period of time.

In the example illustrated, the conveyor mechanism 14 takes the form of a vibratory conveyor, including a carrying deck or tray 22 and a drive mechanism 24. The drive mechanism 24 is configured to generate a vibrating action and impart to the tray 22 an oscillating motion of a frequency and amplitude, which moves the powder 12 in a forward motion in the direction 16 along the tray 22. Various combinations of frequencies and amplitudes can be used, and can be selected depending on characteristics of the powder 12. The conveyor mechanism 14 can further include at least one load cell 32 configured to measure weight of the powder 12 over the length of the tray 22. By installing the tray 22 on the load cell 32, a total weight of the tray 22 and the powder 12 can be measured, and by knowing a weight of the empty tray 22, the weight of the powder 12 on the tray 22 can be determined.

Figure 1B:
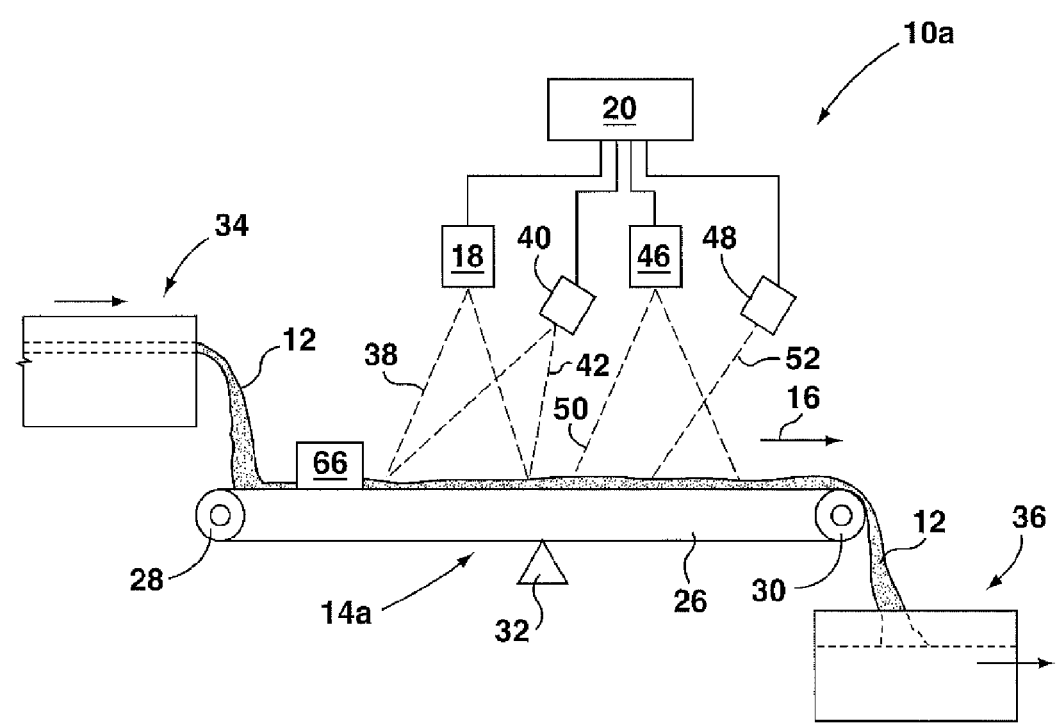
FIG. 1B is a schematic view of another system for measuring flow of a powder.

Referring to FIG. 1B, shown generally at 10a is another example of a system for measuring flow of a powder 12, in which a conveyor mechanism 14a takes the form of a belt conveyor. The conveyor mechanism 14a includes a belt 26 suspended between first and second pulleys 28, 30. At least one of the pulleys 28, 30 can be driven to move the belt 26 and the powder 12 loaded thereon in a forward motion in the direction 16. The conveyor mechanism 14a can also include at least one load cell 32 configured to measure the weight of the powder 12 over the length of the belt 26.

Aside from vibratory and belt conveyors, it should be appreciated that other apparatuses can be used to convey the powder 12. Further, although the load cell 32 is described herein as a means of determining a weight of the powder 12 over a given length of the conveyor mechanism 14, 14a, other methods and apparatuses can be used to obtain suitable weight measurements or estimates.

Referring now to either of FIGS. 1A and 1B, the system 10, 10a further includes an inflow dispensing device 34 to deliver the powder 12 to the conveyor mechanism 14, 14a, and the conveyor mechanism 14, 14a conveys the powder 12 to an outflow dispensing device 36. The devices 34, 36 can include, for example, vibratory conveyors, belt conveyors, screw conveyors, feeder valves, MATCON™ valves, among others.

Typically, the powder 12 is fed to the conveyor mechanism 14, 14a by a bin or a hopper (not shown), and it can be desirable to minimize weight effects of the powder 12 being fed to the conveyor mechanism 14, 14a to reduce or avoid interference with readings of the load cell 32. Thus, in some examples, the inflow dispensing device 34 can include two or more separate devices to isolate the weight of the bin and the powder in it from the tray 22/belt 26 to avoid interfering with the load cell 32.

The first camera device 18 has a field of view 38 that is directed towards an upper surface of the powder 12. Optionally, a first light-emitting device 40 is also arranged generally above the conveyor mechanism 14, 14a. In some examples, the first light-emitting device 40 can include a laser device, or an LED device. An output 42 of the first light-emitting device 40, which is illustrated as being generally conical in shape, is directed downwardly to illuminate at least a portion of the upper surface of the powder 12 in the field of view 38 to aid detection of the recognizable feature by the first camera device 18.

Further, as illustrated, the first light-emitting device 40 can be arranged at an angle relative to the upper surface of the powder 12 so that light in the output 42 strikes the powder 12 at an angle of incidence to create shadow effects that make it easier for the first camera device 18 to detect features on the upper surface of the powder 12. However, in other examples, the relative positions of the first camera device 18 and the first light-emitting device 40 can be reversed so that the first light-emitting device 40 is arranged facing vertically downward and the first camera device 18 is arranged at an angle relative to the powder 12.

Intensity of the light from the first light-emitting device 40 can be controlled and adjusted to generally improve the performance of the first camera device 18 in detecting the features on the upper surface of the powder 12. In other examples, the first light-emitting device can be omitted, with the first camera device 18 being able to detect the features without specialized illumination.

Figure 2A:
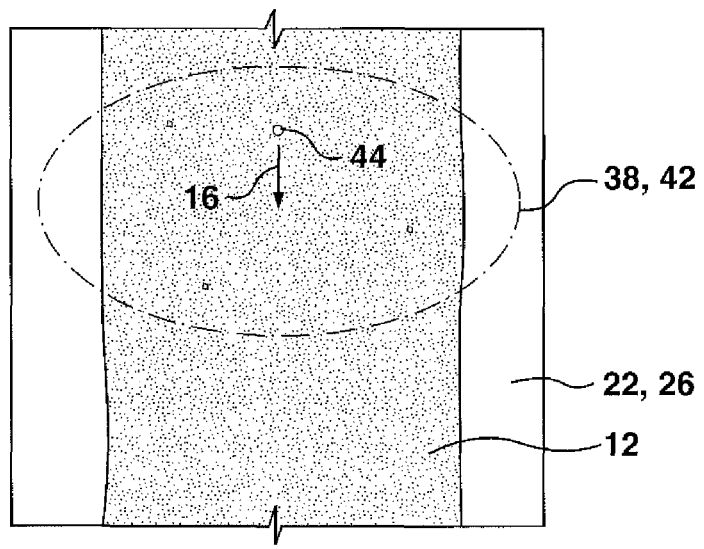
FIGS. 2A and 2B are top views of an upper surface of a powder being conveyed.
Figure 2B:
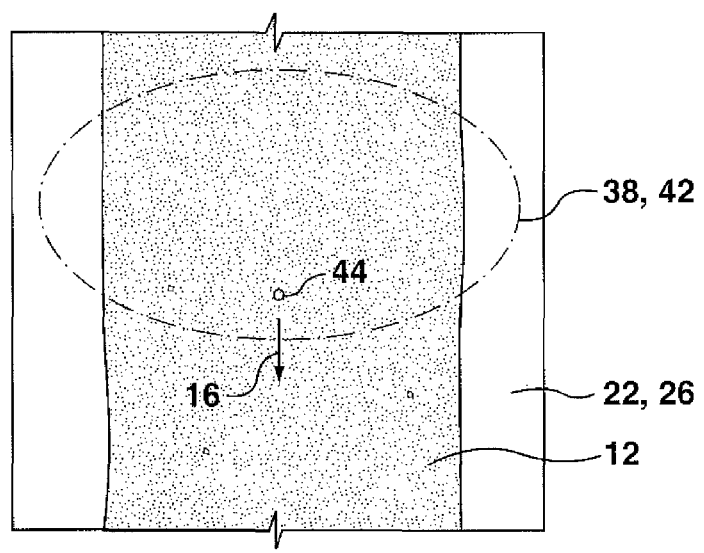

FIGS. 2A and 2B show a recognizable feature 44 on an upper surface of the powder 12, moving from a first position to a second position, respectively, in the direction 16 over a period of time. As the recognizable feature 44 passes through the field of view 38 (optionally illuminated by the output 42 of the first light-emitting device 40, which is shown as being coextensive with the field of view 38, but need not overlap exactly), the first camera device 18 (FIGS. 1A and 1B) detects the movement and relays the information to the processor 20. The processor 20 can then determine a velocity of the powder 12 relative to the tray 22/belt 26 based on the movement of the recognizable feature 44 over the period of time.

In the system 10a shown in FIG. 1B, it may be redundant to calculate the velocity of the powder 12 using the first camera device 18 if the belt 26 of the conveyor mechanism 14a is capable of being set at an accurate speed and the velocity can be readily determined, e.g., displayed on a user interface of the conveyor mechanism 14a. In such examples, the first camera device 18 can be used as a backup to validate other velocity measurements, or can be omitted.

Referring again to either of FIGS. 1A and 1B, the system 10, 10a can further include a second camera device 46 and a second light-emitting device 48, both of which are shown arranged generally above the conveyor mechanism 14, 14a. A field of view 50 of the second camera device 46 and an output 52 of the second light-emitting device 48 is directed downwardly towards the upper surface of the powder 12 on the tray 22/belt 26. In some examples, the second light-emitting device 48 can include a laser device, or an LED device. In some particular examples, the second light-emitting device 48 can include an LED device in combination with a precisely engraved mask to generate the output 52.

Figure 3A:
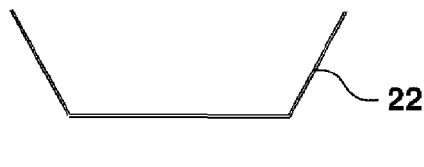
FIG. 3A is a schematic end view of a tray of a conveyor mechanism.
Figure 3D:
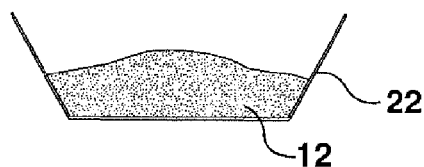
FIG. 3D is a schematic end view of powder being conveyed on the tray of FIG. 3A.
Figure 3B:
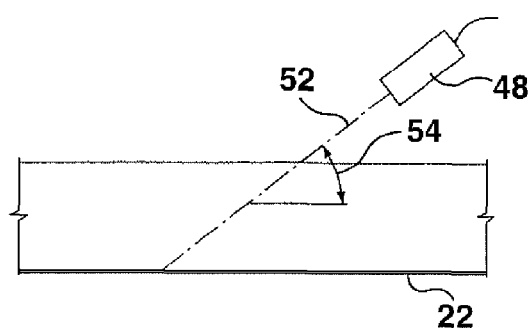
FIGS. 3B and 3C are schematic side and top views, respectively, of the tray of FIG. 3A in combination with a light-emitting device.
Figure 3E:
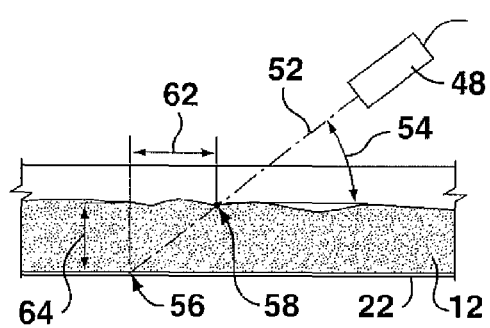
FIGS. 3E and 3F are schematic side and top views, respectively, of the tray and the light-emitting device of FIGS. 3B and 3C with powder being conveyed on the tray.
Figure 3C:
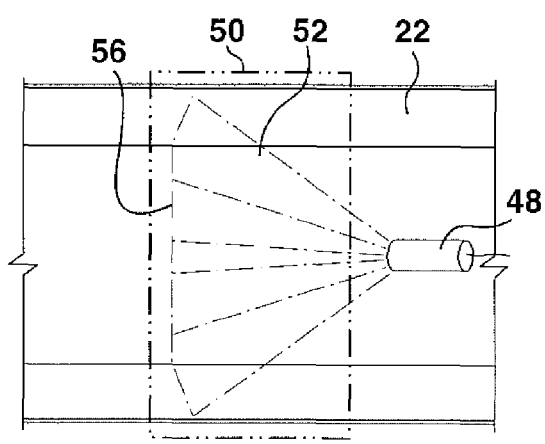

Referring to FIGS. 3A, 3B and 3C, the tray 22 is shown to have a generally trapezoidal cross sectional shape, with a bottom wall, diverging side walls coupled to the bottom wall, and an open top. The second light-emitting device 48 is arranged at an angle of incidence 54 relative to the tray 22. The output 52 of the second light-emitting device 48 can be generally planar in shape, and can project or superimpose a line 56 laterally across the bottom wall and side walls of the tray 22.

Figure 3F:
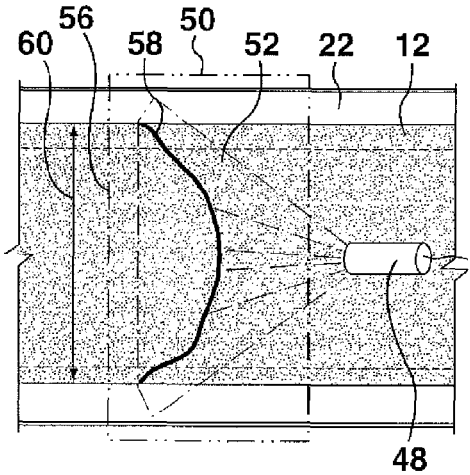

FIGS. 3D, 3E and 3F show the tray 22 conveying the powder 12. The output 52 of the second light-emitting device 48 projects a contour line 58 across a lateral extent 60 of the upper surface of the powder 12, within the field of view 50. Bearing in mind the angle of incidence 54, it should be appreciated that a longitudinal offset dimension 62 of the contour line 58 relative to the line 56 will vary depending on a height dimension 64 across the lateral extent 60 of the upper surface of the powder 12. Thus, it is possible to correlate a cross sectional area of the powder 12 moving along the tray 22 based on the position of the contour line 58, viewed from above. For example, the position of the contour line 58 can be compared relative to a bottom of the tray 22/belt 26. However, the reference need not be the bottom of the tray 22/belt 26, but can be something else that serves as a known, calibrated position.

In this manner, referring back to either of FIGS. 1A and 1B, the second camera device 46 can detect the position of the contour line and relay the information to the processor 20. The processor 20 in turn can correlate the cross sectional area of the powder 12 based on the position of the contour line.

In some examples, instead of a contour line, the output 52 of the second light-emitting device 48 can project a pattern onto the powder 12. A pattern can improve accuracy and robustness of the second camera device 46 in detecting the output 52, versus a generally planar output, for example, which may suffer from poor line sharpness and power distribution inhomogeneity. For instance, the pattern can be a grid of lines, or a plurality of parallel lines. In such examples, the processor 20 is configured to detect the pattern using the second camera device 46, and correlate the cross sectional area of the powder 12 based on the position of the pattern relative to either the tray 22/belt 26 being vacant of the powder 12, or some known, calibrated position. In this case, correlation of the cross sectional area may be more complicated compared to that of the output 52 which projects the contour line 58 (see FIG. 3F).

If a velocity (cm/s) of the powder 12 being conveyed on the tray 22 is known, and a cross sectional area ($cm^2$) of the powder 12 being conveyed on the tray 22 is known, then a volume of the powder 12 being conveyed on the tray 22 in a unit of time can be determined as follows:

$$\frac{cm}{s} \times cm^2 = \frac{cm^3}{s}. \quad \text{(Eq. 1)}$$

On the other hand, if a velocity (cm/s) of the powder 12 being conveyed on the tray 22 is known, and a weight of the powder 12 over a unit length of the tray 22 (kg/cm) is known (e.g., determined by the load cell 32), then a mass of the powder 12 being conveyed on the tray 22 in a unit of time can be determined as follows:

$$\frac{cm}{s} \times \frac{kg}{cm} = \frac{kg}{s}. \quad \text{(Eq. 2)}$$

Thus, the processor 20 can be further configured to: calculate a volume flow rate of the powder 12 based on the velocity and the cross sectional area of the powder; and/or calculate a mass flow rate of the powder 12 based on the velocity and a weight of the powder 12 over a given length of the conveyor mechanism 14, 14*a*. Calculation of volume and mass flow rates can be carried out on a continuous basis in real-time or near real-time. Volume and mass flow rate data can be used in a process control strategy, with each being used to validate the other measurement, and to identify process drift.

Figure 4A:
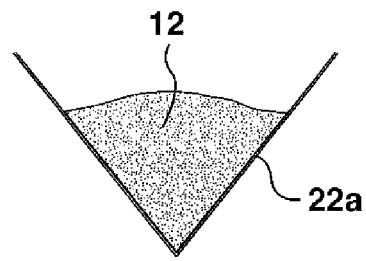
FIGS. 4A, 4B and 4C are schematic end views of powder being conveyed on other trays.
Figure 4B:
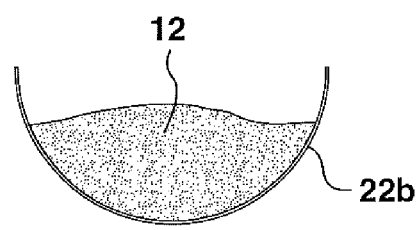
Figure 4C:
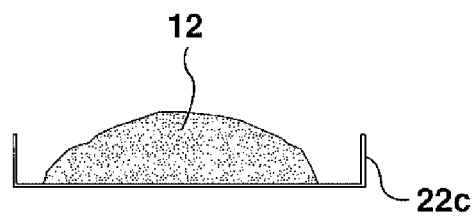

FIG. 4A shows a tray 22*a* that is V-shaped in cross section. FIG. 4B shows a tray 22*b* that has a semi-circular cross sectional shape. FIG. 4O shows a tray 22*b* that has a rectangular cross sectional shape. Various other configurations are possible. In each case, it should be appreciated that a calculation to correlate the cross sectional area of the powder with the position of the contour line will vary to account for the geometry of the particular tray or belt.

Referring back to FIGS. 1A and 1B, as illustrated, the second light-emitting device 48 can be arranged at an angle relative to the upper surface of the powder 12 so that the output 52 strikes the powder 12 at an angle. However, in other examples (see FIG. 8), the relative positions of the second camera device 46 and the second light-emitting device 48 can be reversed so that the second light-emitting device 48 is arranged facing vertically downward and the second camera device 46 is arranged at an angle relative to the powder 12.

Further, as illustrated, the devices 18, 40, 46, 48 and the processor 20 can be arranged as separate components, or alternatively they can be integrated into a single measurement module (not shown) arranged generally above the conveyor mechanism 14, 14*a*. In some other examples, the devices 18, 46 can in fact be a single camera device. The devices 18, 46 can also be designed so as to reduce the effects of vibration, and, for example, can include mechanical dampening systems or software filters to compensate.

Moreover, the devices 46, 48 can be arranged downstream from the devices 18, 40 relative to the direction 16, as shown in FIGS. 1A and 1B. Alternatively, the devices 46, 48 can be upstream from the devices 18, 40 (see FIG. 8), so that the cross sectional area of the powder is detected with the device 46 prior to determining the velocity of the powder with the device 18. Various configurations are possible.

By way of example, and not intended to be limiting, a Basler Ace™ acA1600-20g camera, in combination with a M3Z1228C-MP lens, and an Edmund Optics™ NT64-898 filter with a polarizer/analyzer LED ring light (110V), can be implemented as the first camera device 18 and the first light-emitting device 40. An Allied Vision Technologies Manta™ G-504 camera (also in combination with a M3Z1228C-MP lens) can be implemented as the second camera device 46. An Opto Engineering™ LT PR 3W LED pattern projector (with pattern number PT00000100L) can be implemented as the second light-emitting device 48. For the processor 20, an Avalue™ EPS-QM57 controller can be implemented.

In other examples, a Cognex In-Sight™ 5600 Vision System (with PatMax™, and equipped with a LFC-06F Fujinon™ lens) may be used as the camera devices 18, 46 described herein. Further, a Cognex ILLL45™ S&Y Laser Line Generator (45 degree fan angle, and equipped with a IMRF-BP660-27 Midwest Optical Systems™ dark red band pass filters) may be used as the light-emitting devices 40, 48 described herein.

With continued reference to FIGS. 1A and 13, the system 10, 10*a* can further include a device 66 coupled to the conveyor mechanism 14, 14*a*. The device 66 is configured to generate a recognizable feature in the upper surface of the powder 12, upstream from the first camera device 18. The device 66 can sequentially generate a plurality of the recognizable features on the upper surface of the powder 12, and the first camera device 18 can then detect movement of each of the recognizable features over periods of time so that the processor 20 can calculate a series of velocity measurements.

Figure 5A:
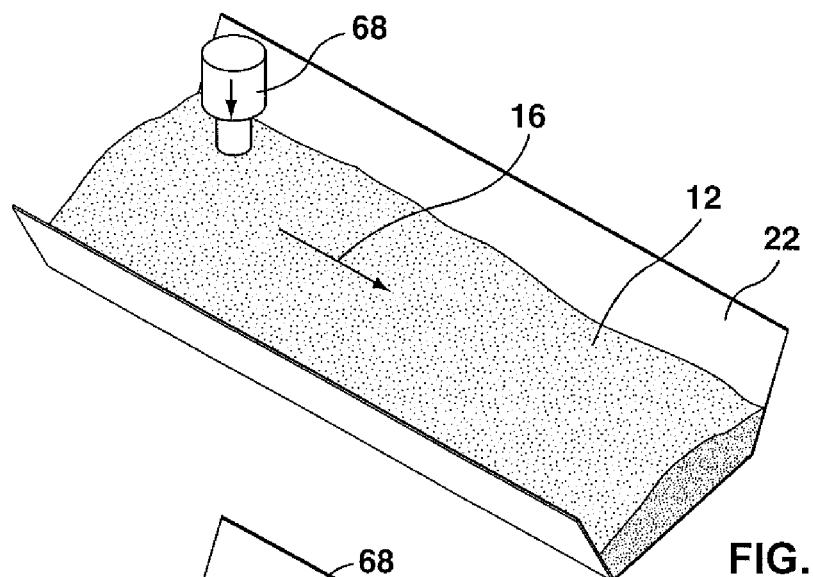
FIGS. 5A, 5B and 5C are perspective views of an apparatus for generating recognizable features on an upper surface of a powder.
Figure 5B:
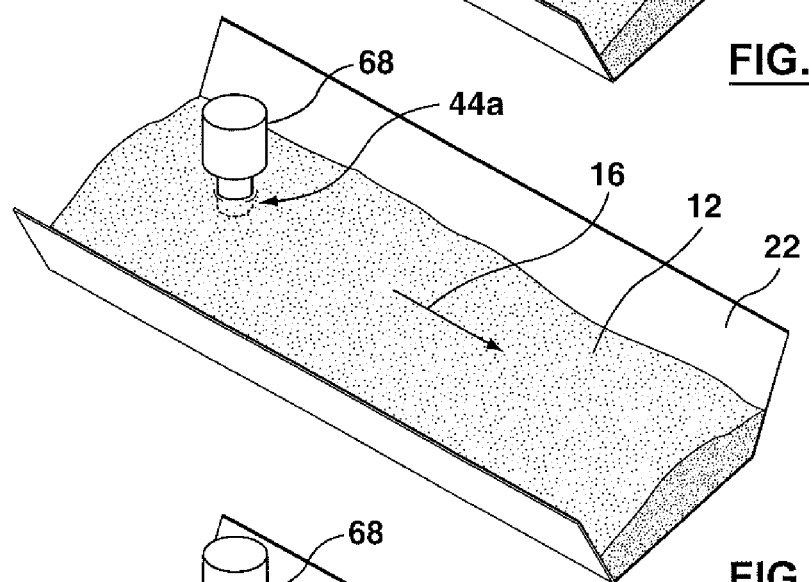
Figure 5C:
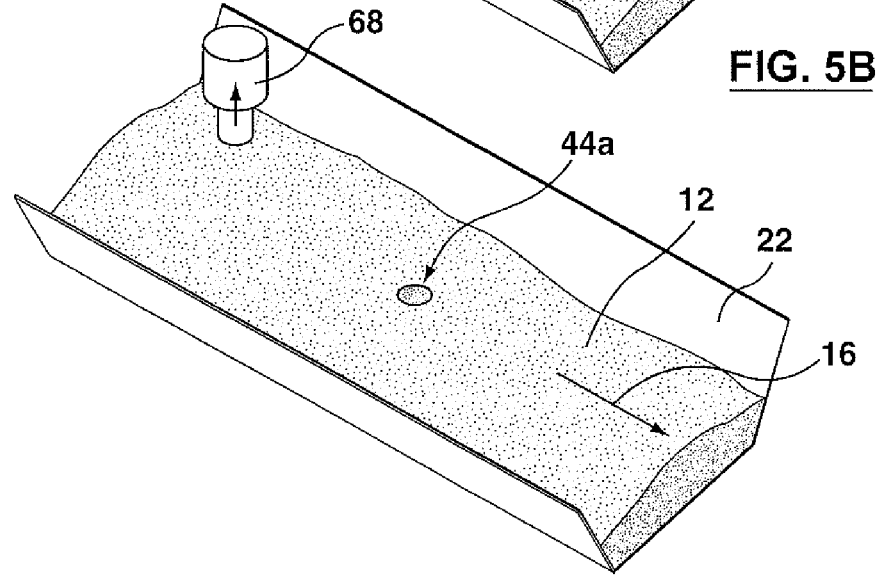

FIGS. 5A, 5B and 5C show an example of an apparatus that can be implemented as the device 66 in FIGS. 1A and 1B. In this case, a piston element 68 is arranged generally above the tray 22, and is configured to engage the upper surface of the powder 12 to generate a recognizable feature 44*a*. The recognizable feature 44*a* is then conveyed downstream in the direction 16.

Figure 6A:
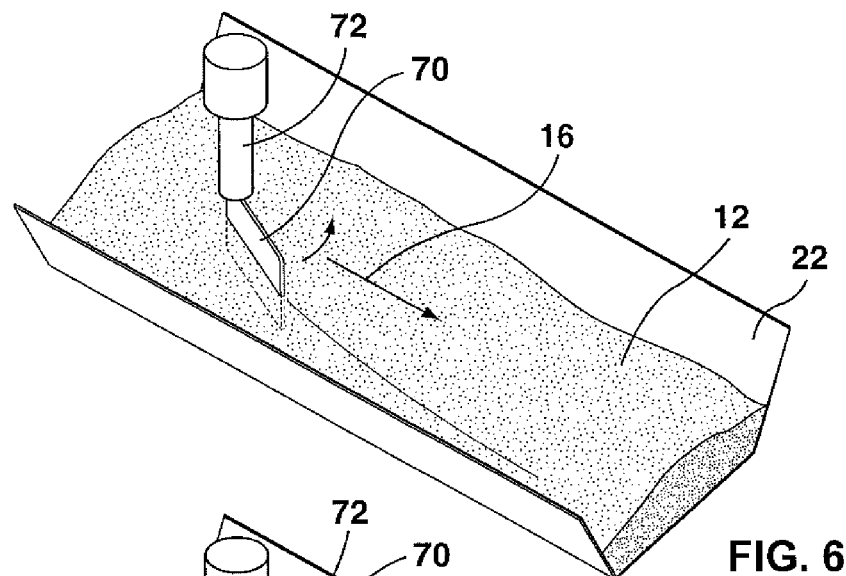
FIGS. 6A, 6B and 6C are perspective views of another apparatus for generating recognizable features on an upper surface of a powder.
Figure 6B:
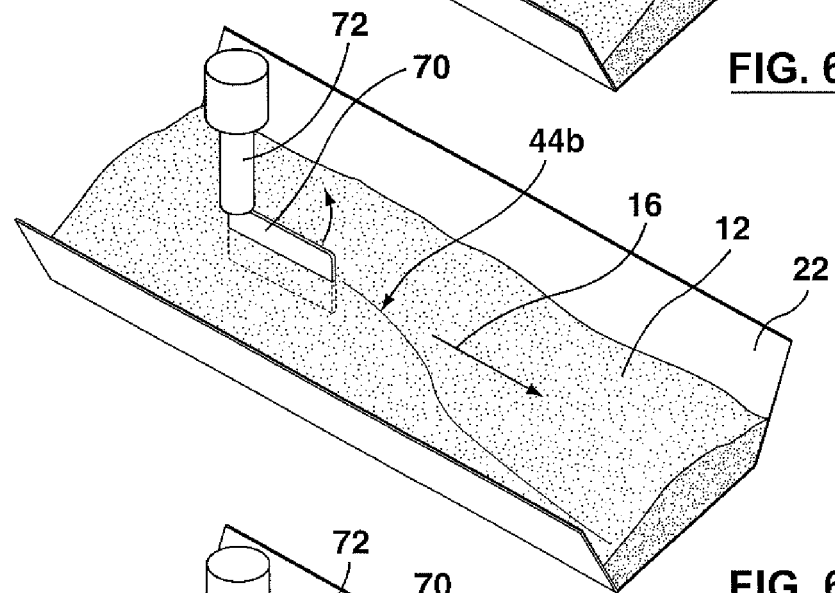
Figure 6C:
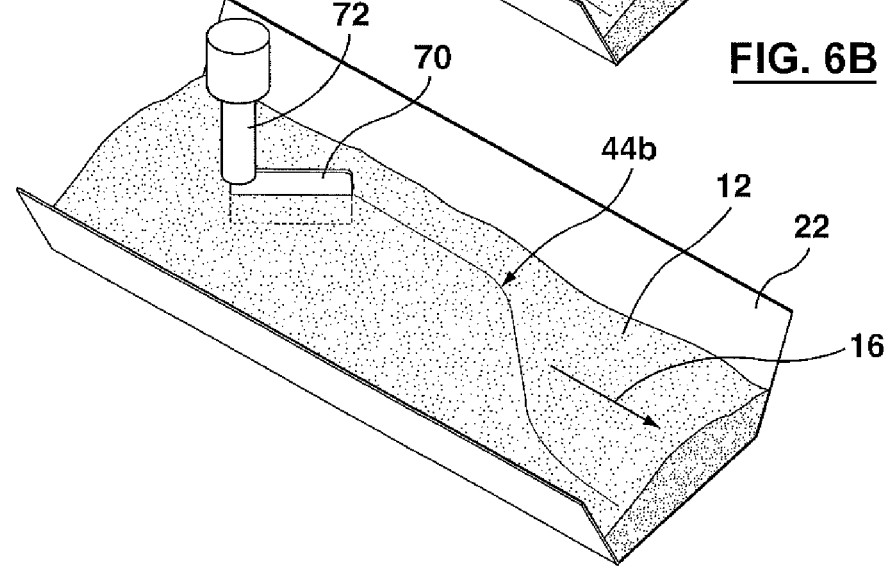
Figure 7A:
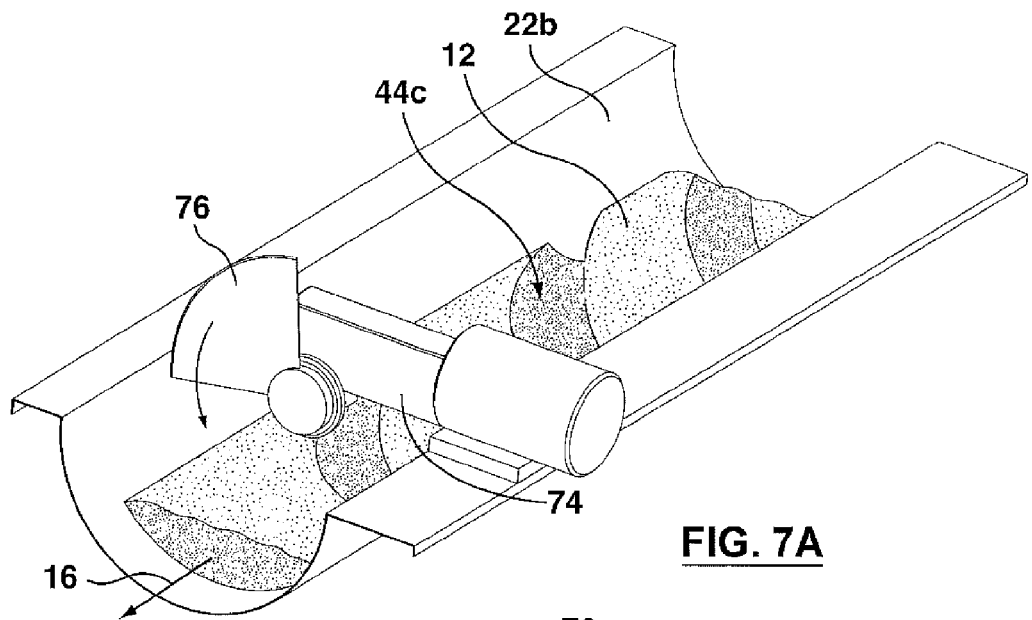
FIG. 7A is a perspective view and FIGS. 7B, 7C, 7D and 7E are end views of another apparatus for generating recognizable features on an upper surface of a powder.
Figure 7B:
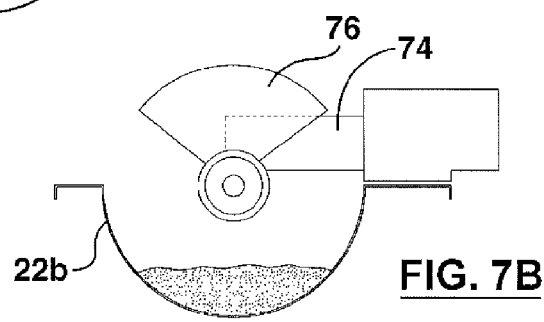
Figure 7C:
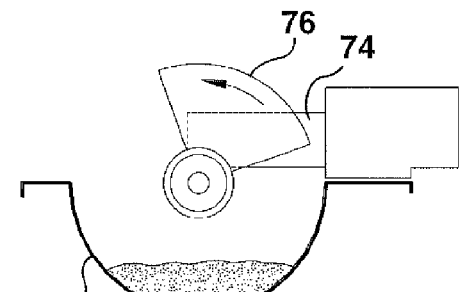
Figure 7D:
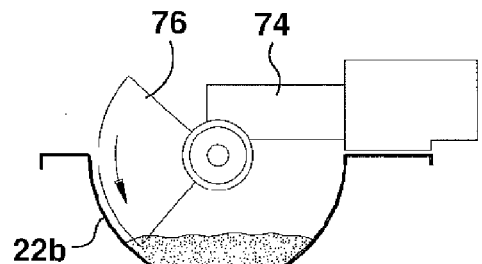
Figure 7E:
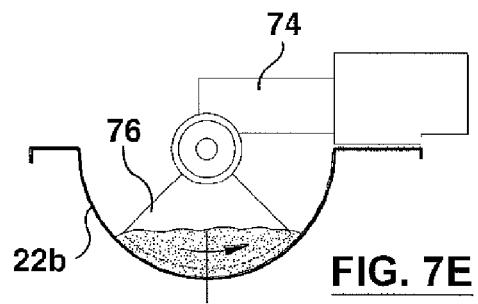

FIGS. 6A, 6B and 6C show another example apparatus that can be implemented as the device 66 in FIGS. 1A and 1B. A rudder element 70 is coupled to a base element 72 arranged generally above the tray 22. The rudder element 70 is at least partially immersed in the powder 12 and is configured to transversely pivot about the base element 72 and relative to the tray 22 to generate a recognizable feature 44*b* in the upper surface of the powder 12, which is conveyed downstream in the direction 16. The arrangement with the rudder element 70 allows the recognizable feature 44*b* to be generated but generally avoids or at least reduces interference with a weight measurement (e.g., by the load cell 32 in FIG. 1A or 1B).

FIGS. 7A, 7B, 7C, 7D and 7E show yet another example apparatus that can be implemented as the device 66 in FIGS. 1A and 1B. A hub 74 is arranged generally above the tray 22*b*. A blade element 76 is coupled to the hub 74 and is rotatable thereabout to engage the upper surface of the powder 12 to generate a recognizable feature 44*c*. The recognizable feature 44*c* is then conveyed downstream in the direction 16. The arrangement with the blade element 76 also generally avoids or at least reduces interference with a weight measurement.

Figure 8:
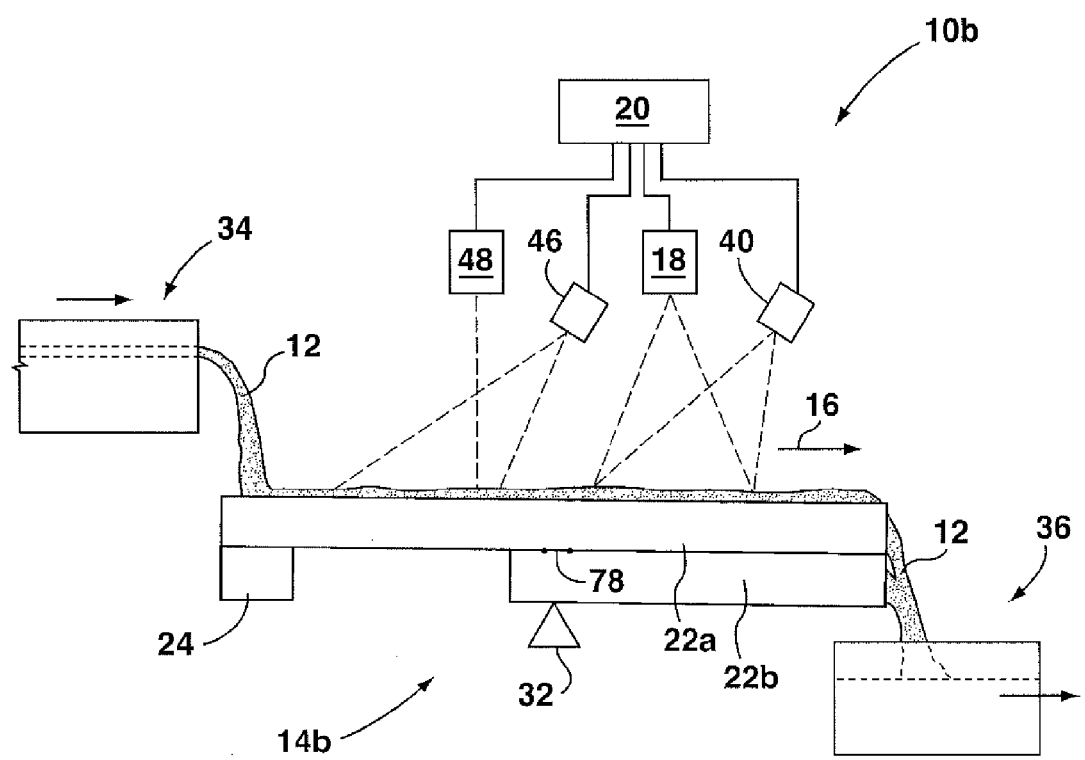
FIG. 8 is a schematic view of another system for measuring flow of a powder.

Referring to FIG. 8, shown generally at 10*b* is another example of a system for measuring flow of a powder 12. A conveyor mechanism 14*b* includes upper and lower vibratory trays 22*a*, 22*b* that are arranged to convey the powder 12 in the direction 16 to the outflow dispensing device 36. A trap door 78 is arranged between the upper tray 22*a* and the lower tray 22*b*. The trap door 78 is configured to generate a recognizable feature in the upper surface of the powder 12.

Figure 9A:
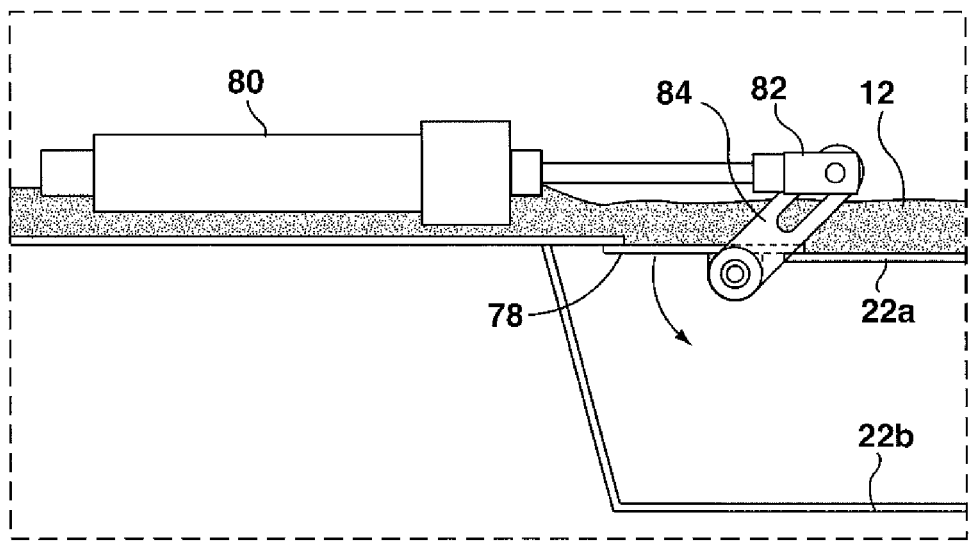
FIGS. 9A and 9B are side views of another apparatus for generating recognizable features on an upper surface of a powder.
Figure 9B:
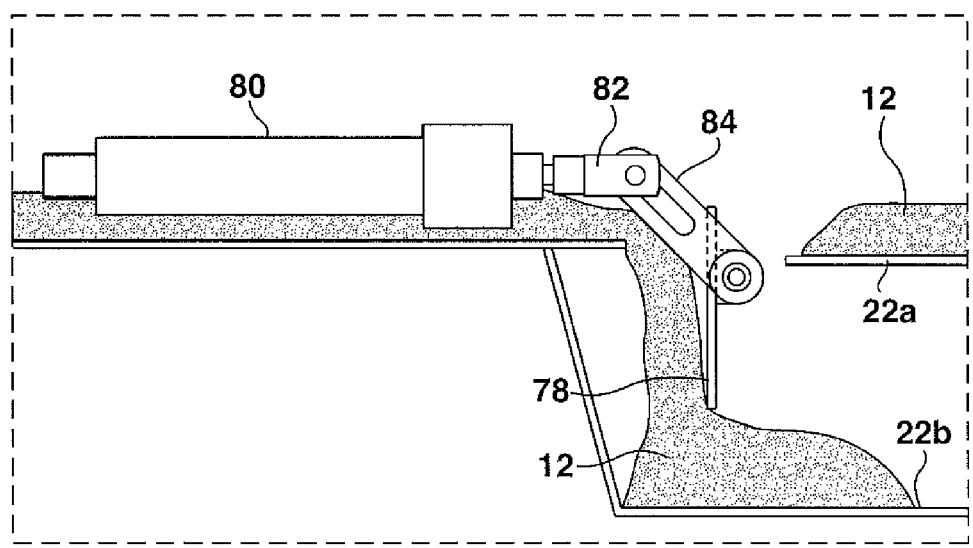

As shown in FIGS. 9A and 9B, the trap door 78 is configured to move between a closed position (FIG. 9A) and an open position (FIG. 9B). In the example illustrated, a linear actuator 80 controls an arm 82. A linkage 84 couples the arm 82 with the trap door 78 so that when the arm 82 is extended, the trap door 78 is maintained in a closed position and the powder 12 is conveyed on the upper tray 22*a*. As the arm 82 retracts, the trap door 78 opens and allows the powder 12 to fall by force of gravity onto the lower tray 22*b*. The linear actuator 80, the arm 82, the linkage 84 can be external to the trays 22*a*, 22*b*.

In the example illustrated, referring again to FIG. 8, the trap door 78 is positioned downstream from the second light-emitting device 48 (which is shown arranged facing vertically downward) and the second camera device 46 (which is shown arranged at an angle relative to the powder 12). Thus, the trap door 78 does not interfere with the detection of the contour line and correlation of the cross sectional area of the powder 12.

The trap door 78 is positioned upstream from the first camera device 18. By opening the trap door 78, flow of the powder 12 in the direction 16 will be interrupted and can expose a portion of the upper tray 22*a*. Thus, the first camera device 18 can identify a trailing edge of the powder 12 as the recognizable feature. The powder 12 dropped to the lower tray 22*b* will continue to move in the direction 16, at generally the same velocity, towards the outflow dispensing device 36, where the powder in the upper and lower trays 22*a*, 22*b* are merged, resulting in the same net flow rate.

While the above description provides examples of one or more apparatuses or methods, it will be appreciated that other apparatuses or methods may be within the scope of the accompanying claims.

I claim:

1. A system for measuring flow of a bulk solid material, comprising:
    a conveyor mechanism to convey the bulk solid material along a path, the conveyor mechanism comprising at least one of a tray and a belt defining a bottom of the conveyor mechanism;
    a light-emitting device arranged above the conveyor mechanism, the light-emitting device comprising at least one of a laser device and an LED device, the light-emitting device directed downwardly to project a contour line across a lateral extent of an upper surface of the bulk solid material as the bulk solid material is conveyed by the conveyor mechanism along the path and, when the conveyor mechanism is empty of the bulk solid material, project a bottom line laterally across the bottom of the conveyor mechanism, the light-emitting device arranged at an angle of incidence relative to the bottom of the conveyor mechanism;
    at least one camera device arranged above the conveyor mechanism, the at least one camera device configured to detect movement of a recognizable feature on the upper surface of the bulk solid material over a period of time as the bulk solid material is conveyed by the conveyor mechanism along the path, and detect a position of the contour line on the upper surface of the bulk solid material; and
    a processor coupled to the at least one camera device, wherein the processor is configured to i) determine a velocity of the bulk solid material based on the movement of the recognizable feature over the period of time,
    ii) compare a position of the contour line relative to a position of the bottom line to determine a longitudinal offset dimension,
    iii) correlate a height dimension of the bulk solid material based on the longitudinal offset dimension and the angle of incidence,
    iv) repeat steps ii) and iii) to correlate a plurality of the height dimensions of the bulk solid material across the lateral extent, and
    v) calculate a cross sectional area of the bulk solid material across the lateral extent based on the plurality of the height dimensions.

2. The system of claim 1, wherein the processor is further configured to calculate a volume flow rate of the bulk solid material based on the velocity and the cross sectional area of the bulk solid material.

3. The system of claim 2, further comprising a measurement apparatus configured to measure a weight of the bulk solid material over a given length of the conveyor mechanism, and the processor is further configured to calculate a mass flow rate of the bulk solid material based on the velocity and the weight of the bulk solid material over the given length of the conveyor mechanism.

4. The system of claim 3, wherein the measurement apparatus comprises at least one load cell for measuring the weight of the bulk solid material over the given length of the conveyor mechanism.

5. The system of claim 1, further comprising a measurement apparatus configured to measure a weight of the bulk solid material over a given length of the conveyor mechanism, and the processor is further configured to calculate a mass flow rate of the bulk solid material based on the velocity and the weight of the bulk solid material over the given length of the conveyor mechanism.

6. The system of claim 5, wherein the measurement apparatus comprises at least one load cell for measuring the weight of the bulk solid material over the given length of the conveyor mechanism.

7. The system of claim 1, wherein the conveyor mechanism comprises the tray, and the lateral extent extends across an entirety of the upper surface of the bulk solid material within the tray.

8. The system of claim 1, wherein the light-emitting device is arranged relative to the bottom of the conveyor mechanism so that the angle of incidence is an acute angle.

9. The system of claim 1, wherein the at least one camera device comprises a first camera device arranged above the conveyor mechanism for detecting the movement of the recognizable feature, and a second camera device arranged above the conveyor mechanism for detecting the position of the contour line.

10. The system of claim 9, wherein at least one of the second camera device and the light-emitting device is arranged at an acute angle relative to the upper surface of the bulk solid material.

11. The system of claim 9, further comprising a second light-emitting device arranged above the conveyor mechanism, and directed downwardly to illuminate at least a portion of the upper surface of the bulk solid material to aid detection of the recognizable feature.

12. The system of claim 11, wherein at least one of the first camera device and the second light-emitting device is arranged at an acute angle relative to the upper surface of the bulk solid material.

13. A method of measuring flow of a bulk solid material, comprising:

conveying the bulk solid material along a path with a conveyor mechanism, the conveyor mechanism comprising at least one of a tray and a belt defining a bottom of the conveyor mechanism;

as the bulk solid material is conveyed by the conveyor mechanism along the path, detecting movement of a recognizable feature on an upper surface of the bulk solid material over a period of time;

determining a velocity of the bulk solid material based on the movement of the recognizable feature over the period of time;

as the bulk solid material is conveyed by the conveyor mechanism along the path, directing a light-emitting device downwardly at the upper surface of the bulk solid material to project a contour line across a lateral extent of the upper surface of the bulk solid material, the light-emitting device comprising at least one of a laser device and an LED device, the light-emitting device arranged at an angle of incidence relative to the bottom of the conveyor mechanism;

detecting a position of the contour line on the upper surface of the bulk solid material;

comparing a position of the contour line relative to a position of a reference element to determine an offset dimension;

correlating a height dimension of the bulk solid material based on the offset dimension and the angle of incidence; and calculating a cross sectional area of the bulk solid material based on the height dimension.

14. The method of claim 13, further comprising repeating the steps of comparing and correlating to correlate a plurality of the height dimensions of the bulk solid material across the lateral extent, and calculating the cross sectional area of the bulk solid material across the lateral extent based on the plurality of the height dimensions.

15. The method of claim 14, further comprising calculating a volume flow rate of the bulk solid material based on the velocity and the cross sectional area of the bulk solid material.

16. The method of claim 15, further comprising measuring a weight of the bulk solid material over a given length of the conveyor mechanism, and calculating a mass flow rate of the bulk solid material based on the velocity and the weight of the bulk solid material over the given length of the conveyor mechanism.

17. The method of claim 13, further comprising using a first camera device arranged above the conveyor mechanism for detecting the movement of the recognizable feature, and a second camera device arranged above the conveyor mechanism for detecting the position of the contour line.

18. The method of claim 17, further comprising directing a second light-emitting device downwardly to illuminate at least a portion of the upper surface of the bulk solid material to aid detection of the recognizable feature.

19. The method of claim 13, further comprising, when the conveyor mechanism is empty of the bulk solid material, projecting a bottom line laterally across the bottom of the conveyor mechanism, and wherein, in the step of comparing, the bottom line is the reference element.

20. The method of claim 13, wherein the bulk solid material consists of a powder.

* * * * *